United States Patent
Sako et al.

(10) Patent No.: US 9,952,674 B2
(45) Date of Patent: Apr. 24, 2018

(54) COMMUNICATION SYSTEM, COMMUNICATION METHOD AND PROGRAM

(71) Applicant: SONY CORPORATION, Tokyo (JP)

(72) Inventors: Yoichiro Sako, Tokyo (JP); Tomoya Onuma, Shizuoka (JP); Akira Tange, Tokyo (JP); Kohei Asada, Kanagawa (JP); Kazuyuki Sakoda, Chiba (JP); Takatoshi Nakamura, Kanagawa (JP); Kazuhiro Watanabe, Tokyo (JP); Yasunori Kamada, Kanagawa (JP); Hiroyuki Hanaya, Kanagawa (JP); Yuki Koga, Tokyo (JP); Mitsuru Takehara, Tokyo (JP); Takayasu Kon, Tokyo (JP); Kazunori Hayashi, Tokyo (JP)

(73) Assignee: SONY CORPORATION, Tokyo (JP)

(*) Notice: Subject to any disclaimer, the term of this patent is extended or adjusted under 35 U.S.C. 154(b) by 309 days.

(21) Appl. No.: 14/429,193

(22) PCT Filed: Aug. 26, 2013

(86) PCT No.: PCT/JP2013/005034
§ 371 (c)(1),
(2) Date: Mar. 18, 2015

(87) PCT Pub. No.: WO2014/061185
PCT Pub. Date: Apr. 24, 2014

(65) Prior Publication Data
US 2015/0248168 A1 Sep. 3, 2015

(30) Foreign Application Priority Data
Oct. 17, 2012 (JP) .................................. 2012-229890

(51) Int. Cl.
*G06F 3/048* (2013.01)
*G06F 3/01* (2006.01)
(Continued)

(52) U.S. Cl.
CPC .............. *G06F 3/017* (2013.01); *G06F 3/015* (2013.01); *G06F 3/0304* (2013.01);
(Continued)

(58) Field of Classification Search
CPC .......... G06F 3/011; G06F 3/016; G06F 3/017; G06F 3/048–3/04886; G06F 3/005
See application file for complete search history.

(56) References Cited

U.S. PATENT DOCUMENTS

2004/0068409 A1 4/2004 Tanaka et al.
2005/0233766 A1 10/2005 Futami
(Continued)

FOREIGN PATENT DOCUMENTS

CN 101741952 A 6/2010
EP 1 408 443 A1 4/2004
(Continued)

OTHER PUBLICATIONS

International Search Report dated Nov. 27, 2013 in PCT/JP2013/005034.
(Continued)

*Primary Examiner* — Claudia Dragoescu
(74) *Attorney, Agent, or Firm* — Oblon, McClelland, Maier & Neustadt, L.L.P.

(57) ABSTRACT

A communication system includes processing circuitry that responds to a recognition result by initiating an electronic communication session with a user-designated destination. The recognition result corresponds with a recognized gesture made by the user as detected by a sensor, and the user-designated destination corresponds with the recognized
(Continued)

gesture. A method and non-transitory computer program product also respond to the recognition result in a similar manner.

20 Claims, 9 Drawing Sheets

(51) Int. Cl.
    *G06F 3/03*     (2006.01)
    *H04M 1/60*     (2006.01)
    *G06F 3/0488*     (2013.01)
    *G06F 3/16*     (2006.01)

(52) U.S. Cl.
    CPC ............ *G06F 3/0488* (2013.01); *G06F 3/167* (2013.01); *H04M 1/6033* (2013.01); *H04M 2250/74* (2013.01)

(56) References Cited

U.S. PATENT DOCUMENTS

| | | | |
|---|---|---|---|
| 2006/0052109 A1 | 3/2006 | Ashman, Jr. et al. | |
| 2008/0246734 A1* | 10/2008 | Tsui | H02J 7/0055 345/169 |
| 2009/0150160 A1* | 6/2009 | Mozer | G06F 3/011 704/275 |
| 2009/0199105 A1* | 8/2009 | Kamada | G06Q 10/10 715/738 |
| 2009/0303204 A1* | 12/2009 | Nasiri | A63F 13/06 345/184 |
| 2011/0119641 A1 | 5/2011 | Lee | |
| 2011/0247065 A1 | 10/2011 | Melnyk | |
| 2013/0328769 A1* | 12/2013 | Jung | G06F 3/017 345/156 |
| 2014/0002376 A1* | 1/2014 | Oliver | G06F 3/016 345/173 |

FOREIGN PATENT DOCUMENTS

| | | |
|---|---|---|
| EP | 1 587 286 A2 | 10/2005 |
| JP | 2000-184050 A | 6/2000 |
| JP | 2001-36628 A | 2/2001 |
| JP | 2001-309326 A | 11/2001 |
| JP | 2002-202791 A | 7/2002 |
| JP | 2002-544637 A | 12/2002 |
| JP | 2003-514449 A | 4/2003 |
| JP | 2006-93901 A | 4/2006 |
| JP | 2008-53937 A | 3/2008 |
| JP | 2008-269174 A | 11/2008 |
| JP | 2010-21924 A | 1/2010 |
| JP | 2010-238145 A | 10/2010 |
| JP | 2012-508530 A | 4/2012 |
| JP | 4938100 B2 | 5/2012 |

OTHER PUBLICATIONS

Combined Chinese Office Action and Search Report dated Dec. 20, 2016 in Patent Application No. 201380053169.7 (with English Translation).
Office Action dated Oct. 6, 2015 in Japanese Patent Application No. 2012-229890.
European Communication Pursuant to Article 94(3) EPC dated Aug. 30, 2016 in Patent Application No. 13 771 218.8.

\* cited by examiner

COMMUNICATION SYSTEM, COMMUNICATION METHOD AND PROGRAM

TECHNICAL FIELD

The present disclosure relates to a communication system and a program.

The present disclosure contains subject matter related to that disclosed in Japanese Priority Patent Application JP 2012-229890 filed in the Japan Patent Office on Oct. 17, 2012, the entire content of which is hereby incorporated by reference.

BACKGROUND ART

In recent years, mobile terminal apparatuses such as notebook personal computers (PCs), smartphones, and tablet terminals have been in widespread use. Such mobile terminal apparatuses each include a button, a switch, and a touch panel display for manipulation input, and each have an application executed in accordance with manipulation input of a user.

As a manipulation input method for a mobile terminal apparatus, it is proposed, in addition to the above-mentioned button and switch for manipulation input, that movement of the mobile terminal apparatus triggers execution of an application. For example, PTL 1 discloses that data supplied from an accelerometer and a proximity sensor that are provided on a mobile device is used to recognize a predetermined pose of a user and a gesture of "shaking" and "flipping" the mobile device. The mobile device disclosed in PTL 1 uses the recognized pose of the user and the recognized gesture as a recorded gesture to execute a recording application.

PTL 2 and PTL 3 disclose that, in a communication apparatus such as a wireless handset, movement of the communication apparatus is detected in accordance with output of an accelerometer provided on the communication apparatus to control a state of the communication apparatus. Specifically, PTL 2 and PTL 3 disclose, for example, that the communication apparatus is turned to an off-hook state when movement of the communication apparatus (transition from a stationary position to movement) is detected. A user can hereby establish communication with an in-coming call without pressing a "call" button. Once the movement of the communication apparatus (transition from the stationary position to the movement) is detected, the communication apparatus may be turned to an immediate on-state such that a dial tone can beep and the user can make a call without pressing the "call" button. In this way, PTL 2 and PTL 3 disclose that a wireless telephone (wireless handset) is turned to an off-hook state or an immediate on-state once an operating mode of the wireless telephone is detected so that the states can be switched in the same way as a wired telephone (wired handset).

Meanwhile, PTL 4 discloses a television telephone terminal configured to compare an image with another image registered in advance for releasing a key lock, and to release the key lock if the images match each other. In this way, a technique is disclosed that executes an application for releasing a key lock, on the basis of not manipulation input through a button or a switch, but image comparison.

CITATION LIST

Patent Literature

PTL 1: JP 2012-508530T
PTL 2: JP 2001-36628A
PTL 3: Japanese Patent Application No. 4938100
PTL 4: JP 2000-184050A

SUMMARY

Technical Problem

However, the techniques disclosed in PTL 1, PTL 2, and PTL 3 are each used for executing a recording operation and the like in accordance with output of an accelerometer and the like provided on a communication terminal (so-called gadget). None of PTL 1, PTL 2, and PTL 3 mentions control according to only a gesture of a user who does not have a communication terminal.

PTL 4 does not also mention control according to only a gesture of a user who does not have a communication terminal.

Particularly, no technique is proposed relating to gesture input on the assumption of a new communication method (communication system) that has a vast number of image sensors, microphones, speakers, and the like widespread, and augments the body of a user.

The present disclosure therefore proposes a communication system and a program that are novel and improved, and can perform communication control in accordance with a gesture.

Solution to Problem

A communication system including processing circuitry that responds to a recognition result by initiating an electronic communication session with a user-designated destination, wherein the recognition result corresponds with a recognized gesture made by the user as detected by a sensor, and the user-designated destination corresponds with the recognized gesture.

A non-transitory computer program product, and a communication method including detecting a recognized gesture by a user with a sensor;
responding with processing circuitry to a recognition result by initiating an electronic communication session with a user-designated destination, wherein the user-designated destination corresponds with the recognized gesture.

Advantageous Effects of Invention

According to embodiments of the present disclosure, it becomes possible to perform communication control in accordance with a gesture.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Overview of Communication System According to Embodiment of Present Disclosure
2. Main Configuration Example of Terminal Apparatus According to Present Embodiment
3. Embodiments
3-1. First Embodiment
3-2. Second Embodiment
3-3. Third Embodiment
4. Conclusion

Figure 1:
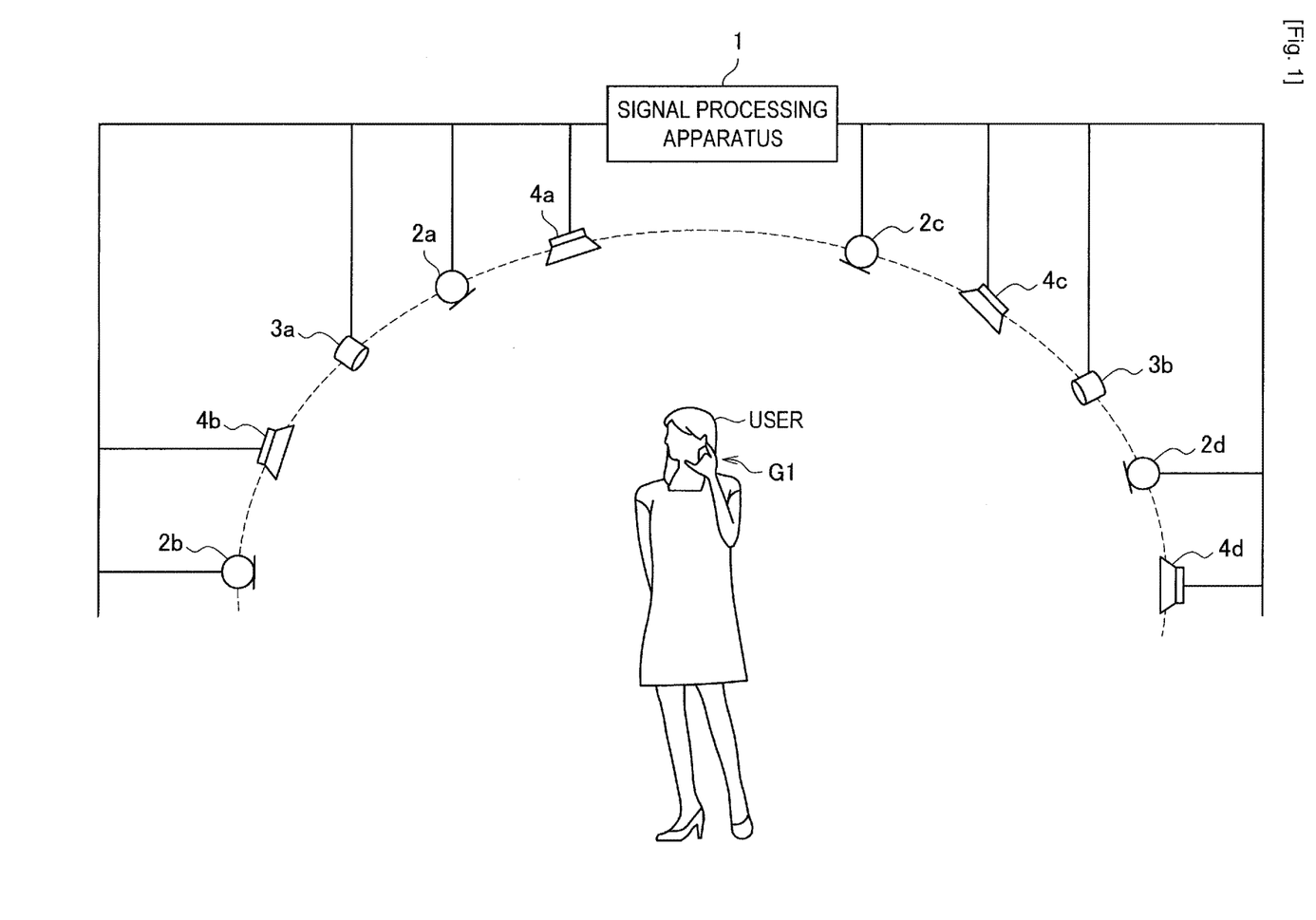
FIG. 1 is a diagram for describing an overview of a communication system according to an embodiment of the present disclosure.

1. Overview of Communication System According to Embodiment of Present Disclosure First, with reference to FIG. 1, an overview of a communication system according to an embodiment of the present disclosure will be described. FIG. 1 is a diagram for describing the overview of the communication system according to the embodiment of the present disclosure. As illustrated in FIG. 1, let us assume in the present embodiment that sensors such as pluralities of microphones (which will be referred to as a mike, hereinafter) 2a to 2d and cameras 3a to 3b, actuators such as speakers 4a to 4d are disposed everywhere on the floor, the wall, and the ceiling inside a building or outside a building.

The mikes 2a to 2d (which will also be referred to as the mike 2, hereinafter) collect the speech of a user, and outputs the collected speech to a signal processing apparatus 1. The cameras 3a to 3b (which will also be referred to as the camera 3, hereinafter) capture the user, and output the captured image to the signal processing apparatus 1. The speakers 4a to 4d (which will also be referred to as the speaker 4) reproduce audio signals (such as the speech of an addressee, a dialing tone, and a ring tone) output from the signal processing apparatus 1.

FIG. 1 illustrates the mikes 2a to 2d, the cameras 3a to 3b, and the speakers 4a to 4d as specific examples of sensors and actuators. However, the number of sensors and the number of actuators are not limited to the example illustrated in FIG. 1. A type of sensors and a type of actuators are not limited to the example illustrated in FIG. 1. For examples, motion sensors may be further disposed as sensors, and displays may be further disposed as actuators. A motion sensor detects that a user is present therearound, and outputs the detection result to the signal processing apparatus 1. Meanwhile, a display displays a Web screen and a mail screen in accordance with display control of the signal processing apparatus 1.

The signal processing apparatus 1 is connected to the sensors and the actuators, and inputs data thereto and outputs data therefrom as described above. The signal processing apparatus 1 can also communicate with (transmit data to and receive data from) a signal processing apparatus connected to sensors and actuators that are disposed around an addressee in a remote location in the same way, and can communicate with a mobile phone terminal and a smartphone held by the addressee.

A new communication system is hereby realized in which a user can communicate with an addressee in a remote location even if the user does not have a communication terminal such as a mobile phone terminal, a smartphone, and a tablet terminal.

For example, input through speech is conceivable as an instruction used when a user starts communication and designates an addressee. Specifically, the signal processing apparatus 1 analyzes the speech of a user that is collected from the mike 2, receives a command such as "I would like to talk with AA," communicates with a signal processing apparatus in an area of AA, and makes a call.

However, if not only speech input but gesture input is also possible, convenience is enhanced more in the new communication system in which a user does not have to carry the above-described communication terminal.

In view of such circumstances, there is therefore provided a communication system according to each embodiment of the present disclosure. It is possible to control a start/end of communication and a type of communication in accordance with a gesture in the communication system according to each embodiment of the present disclosure.

More specifically, the signal processing apparatus 1 recognizes a gesture of a user on the basis of a captured image obtained by the camera 3 capturing the user, and performs communication control in accordance with the recognized gesture. For example, as illustrated in FIG. 1, if a calling gesture G1 is recognized that is made by a user bringing a hand near the face with a thumb and a little finger standing, the signal processing apparatus 1 performs control on a telephone communication start. The control on a telephone communication start sets a calling state (in which a dial tone beeps from the speaker 4, or a dialing tone or a ringing tone to a destination beeps from the speaker 4 if the destination has been already designated), and a receiving state (in which the telephone is answered).

The signal processing apparatus 1 determines a type of communication such as telephone communication, Internet communication, and mail communication in accordance with a gesture. In the case of telephone communication, the signal processing apparatus 1 may perform control such that the calling state is set. In the case of Internet communication and mail communication, the signal processing apparatus 1 may perform control such that a predetermined screen is displayed on a display. In this way, a user can select a type of communication in accordance with a gesture.

Figure 2:
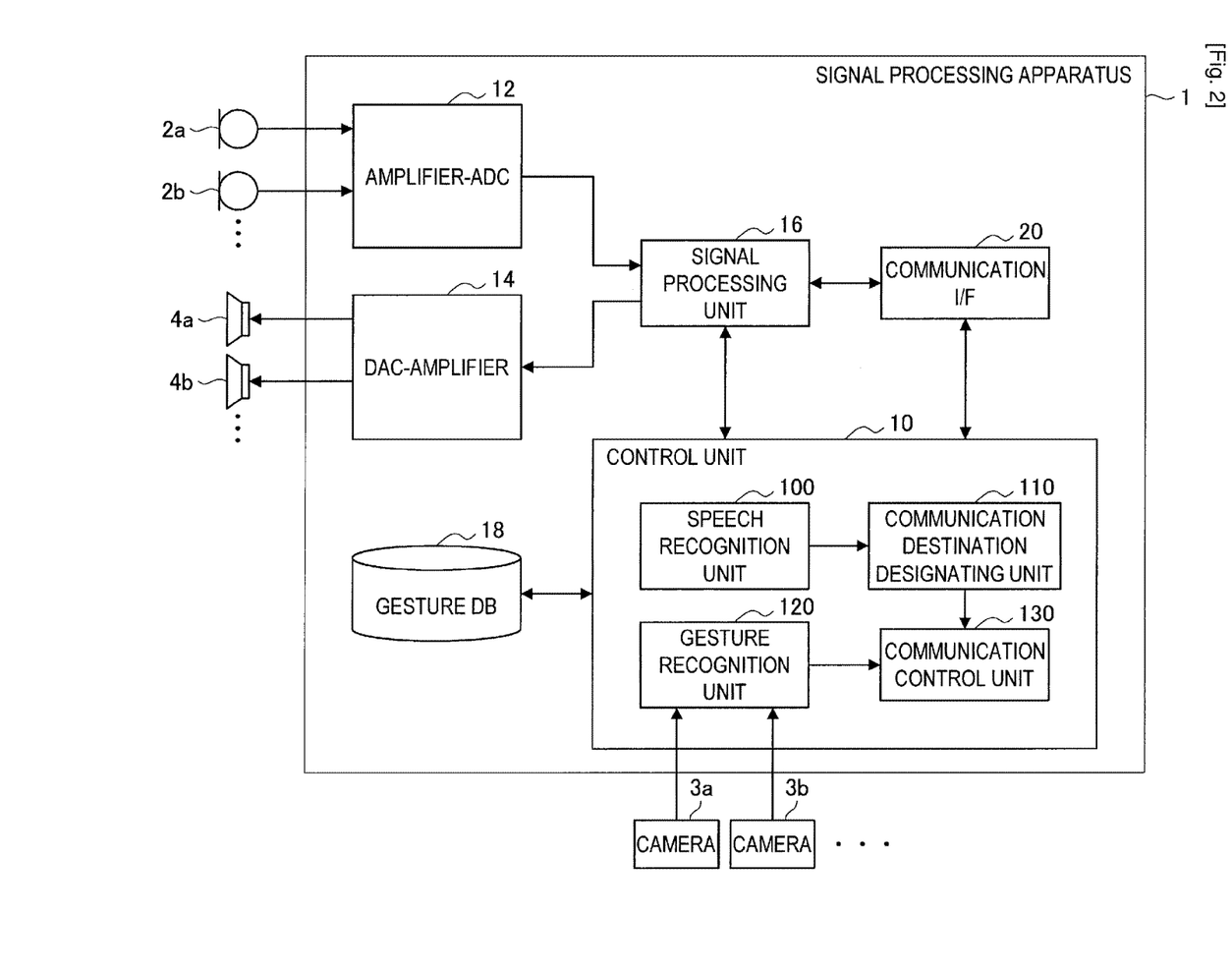
FIG. 2 is a block diagram illustrating a main configuration example of the signal processing apparatus according to the present embodiment.

Next, with reference to FIG. 2, a main configuration example of the signal processing apparatus 1 will be described that is included in the communication system according to the present embodiment.

2. Main Configuration Example of Terminal Apparatus According to Present Embodiment FIG. 2 is a block diagram illustrating the main configuration example of the signal processing apparatus 1 according to the present embodiment. As illustrated in FIG. 2, the signal processing apparatus 1 includes a control unit 10, an amplifier-ADC (analog-digital converter) 12, a DAC (analog-digital converter)-amplifier 14, a signal processing unit 16, a gesture database (DB) 18, and a communication interface (I/F) 20. Although the pluralities of mikes 2, speakers 4, and cameras 3 are configured separately from the signal processing apparatus 1 in the example illustrated in FIG. 2, they may be included in the signal processing apparatus 1.

(Control Unit)

The control unit 10 has a function of controlling configurations of the signal processing apparatus 1. Specifically, as illustrated in FIG. 2, the control unit 10 according to the present embodiment functions as a speech recognition unit 100, a communication destination designating unit 110, a gesture recognition unit 120, and a communication control unit 130.

(Speech Recognition Unit)

The speech recognition unit 100 morphologically analyzes the speech of a user that is collected by the mike 2, and recognizes, for example, a name, a telephone number, an address of an addressee. The speech recognition unit 100 also outputs the recognition result to the communication destination designating unit 110.

(Communication Destination Designating Unit)

The communication destination designating unit 110 has a function of designating (deciding) a communication destination from which the user requests contact in accordance with the recognition result output from the speech recognition unit 100. Specifically, for example, the communication destination designating unit 110 decides a mobile phone terminal held by an addressee as a communication destination on the basis of a telephone number associated with the name of the communication addressee, whose speech has been recognized, and the telephone number of the communication addressee, whose speech has been recognized. The communication destination designating unit 110 may also decide, as a communication destination, a signal processing apparatus connected to mikes and speakers that are disposed around a place in which an addressee is currently present whose speech has been recognized. In this case, the communication destination designating unit 110 may make an inquiry to a management server (not shown) through the communication I/F 20 to acquire the IP address and the like of the signal processing apparatus connected to the mikes and the speakers that are disposed around the place in which the addressee is currently present.

As explained above, it has been described that the communication destination designating unit 110 decides, as a communication destination, a target designated by a user. However, a way of deciding a communication destination according to each embodiment of the present disclosure is not limited thereto. The communication destination designating unit 110 may decide, as a communication destination, a default target that is set in advance.

(Gesture Recognition Unit)

The gesture recognition unit 120 recognizes a gesture of a user on the basis of a captured image captured by the camera 3. The gesture recognition unit 120 also outputs the recognition result to the communication control unit 130. A gesture recognized by the gesture recognition unit 120 may be registered in the gesture DB 18 in advance. For example, the gesture recognition unit 120 compares, for example, a captured image with a gesture image registered in the gesture DB 18, and recognizes a gesture if shapes and movement of hands match each other.

(Communication Control Unit)

The communication control unit 130 controls communication with the communication destination designated by the communication destination designating unit 110, in accordance with the gesture recognized by the gesture recognition unit 120. Specifically, the communication control unit 130 performs control on a telephone communication start/end, and performs control such that connection is established through a communication protocol according to a type of communication. The communication control unit 130 also refers to the gesture DB 18 to perform control associated with the recognized gesture.

(Amplifier-ADC)

The amplifier-ADC 12 includes an amplifier configured to amplify speech information output from the mike 2, and an ADC configured to convert the speech information amplified by the amplifier from analog electric signals to digital electric signals. The amplifier-ADC 12 also outputs the speech information converted to digital electric signals to the signal processing unit 16.

(DAC-Amplifier)

The DAC-amplifier 14 includes a DAC configured to convert the speech information of the communication destination output from the signal processing unit 16 from digital electric signals to analog electric signals, and an amplifier configured to amplify the speech information converted to analog electric signals. The DAC-amplifier 14 also outputs the speech information, which has been converted to analog electric signals and amplified, to the speaker 4.

(Signal Processing Unit)

The signal processing unit 16 has a function of performing predetermined signal processing on the speech information (transmission speech), which has been collected by the mike 2 and output from the amplifier-ADC 12, or the speech information (reception speech), which has been received through the communication I/F 20, in accordance with control of the control unit 10. The predetermined signal processing is, for example, noise reduction processing.

The signal processing unit 16 also outputs the speech information of the user, which has been collected by the mike 2 and subjected to noise reduction processing, for example, to the speech recognition unit 100 of the control unit 10. During telephone communication, the signal processing unit 16 may directly output the speech information of the user, which has been collected by the mike 2 and subjected noise reduction processing, for example, to the communication I/F 20 as the transmission speech, and may have the speech information transmitted to the communication destination.

(Gesture DB)

The gesture DB 18 stores data in which a gesture is associated with communication control. Specifically, the gesture DB 18 may store an image (such as a still image and a moving image) of a gesture in association with a content (such as a communication start/end, and a type of communication) of the corresponding communication control.

(Communication I/F)

The communication I/F 20 has a function of transmitting data to and receiving data from an external apparatus. Specifically, the communication I/F 20 according to the present embodiment transmits the speech information (transmission speech) output from the signal processing unit 16 to a telephone communication destination. The communication I/F 20 also receives the speech information (reception speech) of the addressee from the telephone communication destination, and outputs the speech information to the signal processing unit 16. The communication I/F 20 controls a communication start/end in accordance with control of the communication control unit 130 of the control unit 10. The communication I/F 20 establishes connection through a communication protocol according to a predetermined type of communication in accordance with control of the communication control unit 130 of the control unit 10. Specifically, the communication I/F 20 establishes connection to a predetermined line through a communication protocol according to various types of communication such as telephone communication, mail communication, and Internet communication in accordance with control of the communication control unit 130.

As explained above, the main configuration example of the signal processing apparatus 1 according to the present embodiment has been described in detail. Next, with reference to a plurality of embodiments, communication control performed by the signal processing apparatus 1 according to the present embodiment in accordance with a gesture will be specifically described.

3. Embodiments

3-1. First Embodiment

Figure 3:
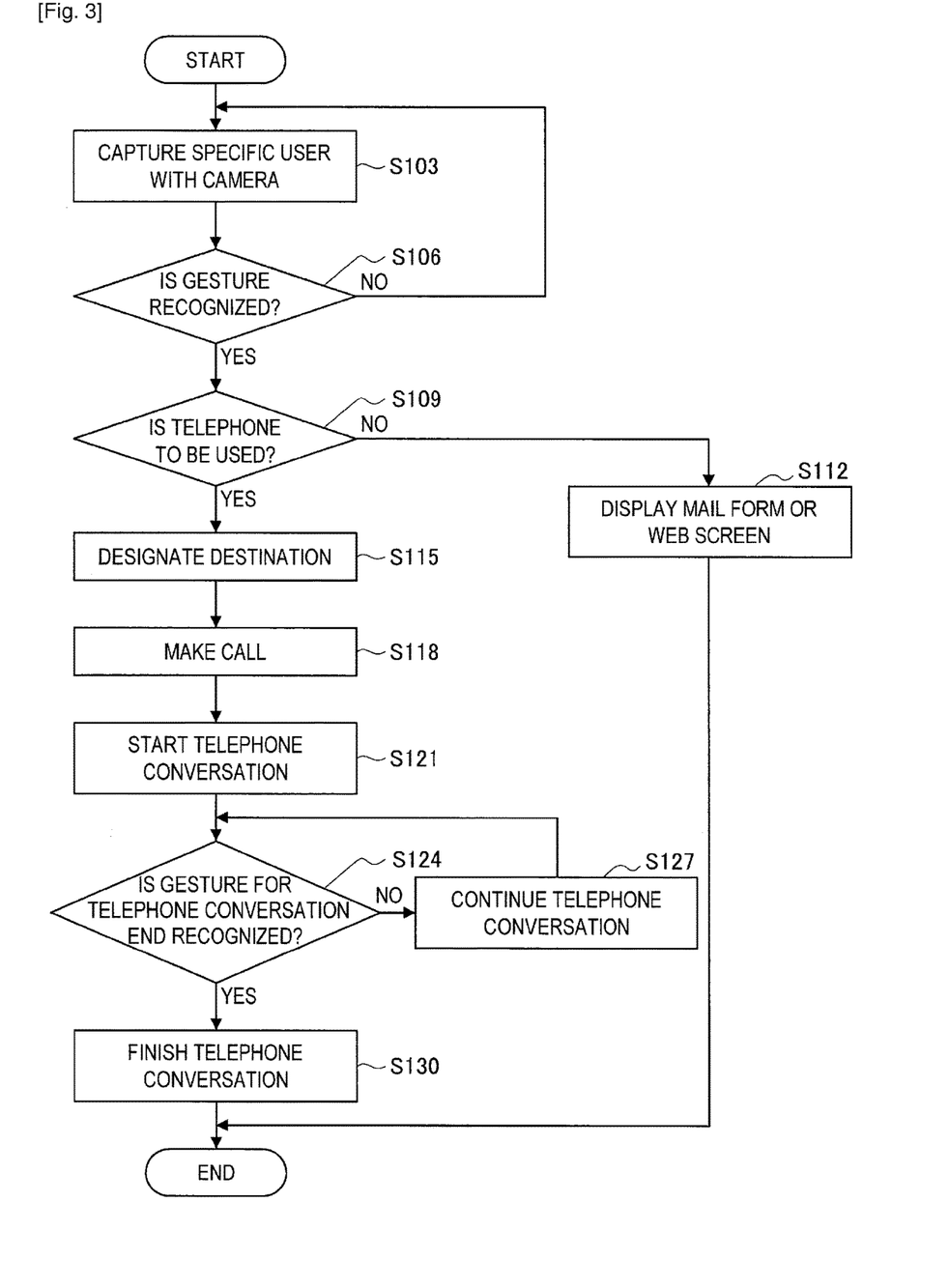
FIG. 3 is a flowchart illustrating processing of communication control according to a first embodiment.

FIG. 3 is a flowchart illustrating processing of communication control according to a first embodiment. As illustrated in FIG. 3, first, in step S103, the camera 3 captures a specific user, and outputs the captured image to the signal processing apparatus 1.

Subsequently, in step S106, the gesture recognition unit 120 of the signal processing apparatus 1 recognizes a gesture on the basis of the captured image. The recognized gesture may be a common gesture used for starting any of telephone communication, mail communication, and Internet communication, or may be an individual gesture indicating a start of any of telephone communication, mail communication, and Internet communication. The gesture recognition unit 120 may continuously perform gesture recognition processing on captured images that are continuously output from the camera 3.

Next, if a gesture can be recognized (S106/YES), the communication control unit 130 determines, in step S109, whether to start telephone communication. Specifically, for example, when a gesture recognized by the gesture recognition unit 120 is an individual gesture indicating a telephone communication start, the communication control unit 130 determines that telephone communication is started. Alternatively, when the recognized gesture is a common gesture indicating a communication start, the communication control unit 130 shifts to a setting mode for setting a type of communication with a communication destination. For example, the communication control unit 130 determines, in accordance with whether the mike 2 collects the speech of a user, whether to start telephone communication.

Figure 4:
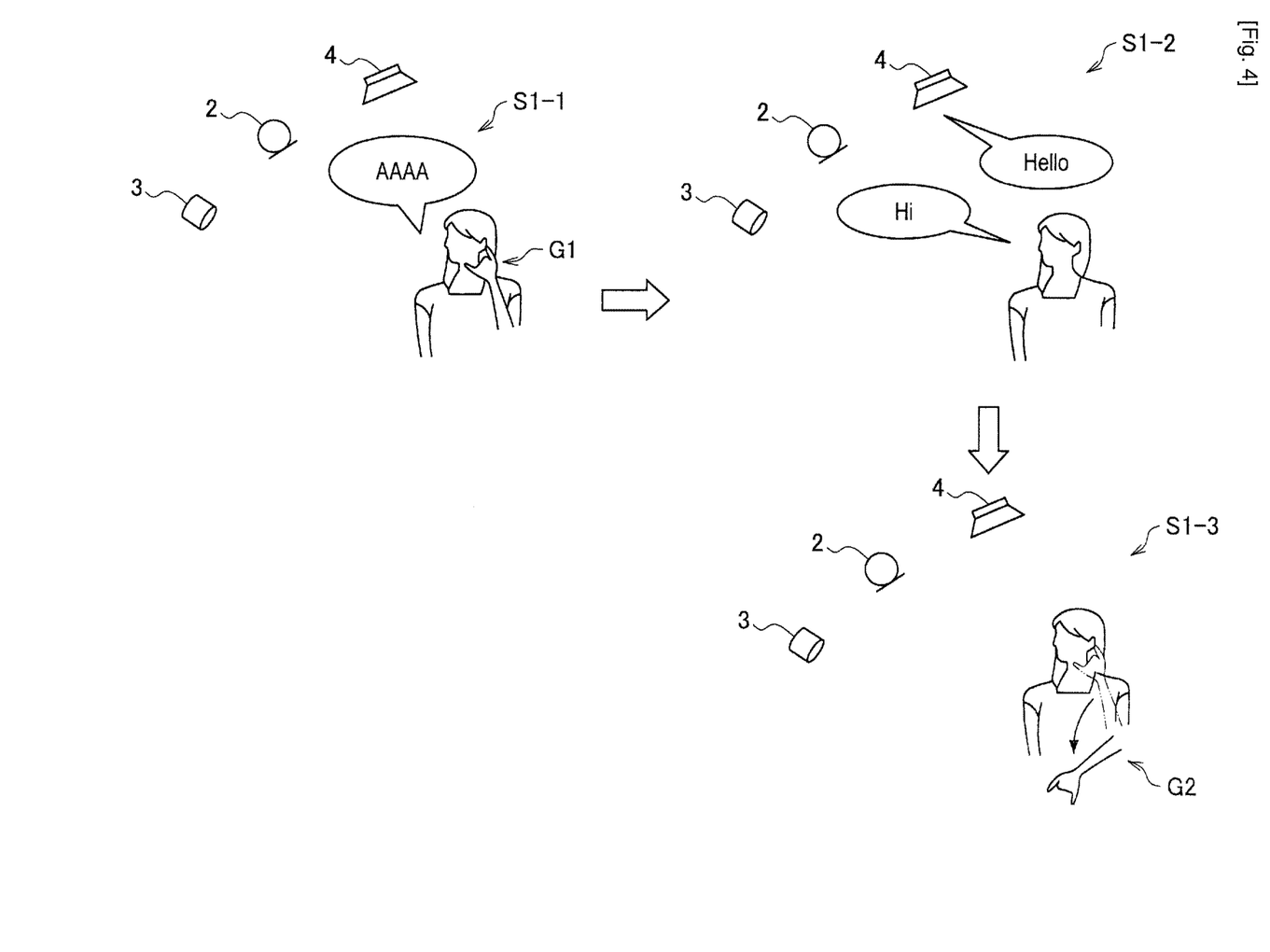
FIG. 4 is a diagram for describing an example of gesture input on telephone communication according to the first embodiment.

With reference to FIG. 4, an example of gesture input on telephone communication will be described. As illustrated in a state S1-1 of FIG. 4, the camera 3 captures the gesture G1, which is made by a user bringing a hand near an ear with only a thumb and a little finger standing, and the gesture recognition unit 120 recognizes the gesture. If the gesture is an individual gesture indicating a telephone communication start, the communication control unit 130 determines that telephone communication is started. If the gesture is a common gesture indicating a communication start and the mike 2 further collects the speech (such as utterance of a telephone number and utterance of a name of a communication addressee) of a user, the communication control unit 130 may determine that telephone communication is started. A common gesture and an individual gesture indicating a telephone communication start are conceivable in various manners. Furthermore, what a gesture means are different in each country and in each culture. The gesture recognition unit 120 may therefore perform gesture recognition in accordance with nationality of a user or a country in which a user stays (switch gesture recognition). A country in which a user stays means, for example, a country in which the user resides. Specifically, if a user having nationality of B country resides in A country, the user is probably familiar with gestures of A country, though the user has nationality of B country. Consequently, the gesture recognition unit 120 performs different gesture recognition in accordance with a country in which a user resides.

Subsequently, if it is determined that telephone communication is started (S109/YES), the communication control unit 130 establishes, in step S115, telephone communication connection, sets a calling state (outputs, for example, a dial tone from the speaker 4), and further has the communication destination designating unit 110 designate a communication destination. Specifically, for example, the mike 2 collects the speech articulated while a user speaks a telephone number or a name of a communication destination, the speech recognition unit 100 recognizes the collected speech information, and the communication destination designating unit 110 designates the addressee on the basis of the recognition result. The communication addressee unit 110 may also designate a default destination that is set in advance.

Next, in step S118, the communication control unit 130 has the communication destination designating unit 110 make a call to the communication destination. At this time, the control unit 10 may output a ringing tone from the speaker 4.

Subsequently, in step S121, the communication control unit 130 starts a telephone conversation if the destination responds. For example, as illustrated in a state S1-2 of FIG. 4, the speech (reception speech) of the destination received through the communication I/F 20 is hereby output from the speaker 4, and the speech (transmission speech) of the user is collected from the mike 2 to be transmitted to the destination through the communication I/F 20.

Next, in step S124, the gesture recognition unit 120 determines whether a gesture for a communication end is recognized. Specifically, for example, as illustrated in a state S1-3 of FIG. 4, when the camera 3 captures a gesture G2 made by a user moving downward a hand from an ear with only a thumb and a little finger standing after a telephone conversation has been started (during a telephone conversation), the gesture recognition unit 120 recognizes the gesture as a gesture for a telephone conversation end.

If the gesture for a telephone conversation end is recognized (S124/YES), the communication control unit 130 performs, in step S130, control such that a telephone conversation is finished.

If the gesture for a telephone conversation end is not recognized (S124/NO), the communication control unit 130 continues, in step S127, a telephone conversation.

Meanwhile, if it is determined, in step S109, that communication is not telephone communication (S109/NO), the control unit 10 starts/prepares for, in step S112, mail communication or Internet communication. Specifically, the control unit 10 prepares for mail communication by displaying a mail form on a display disposed around the user, and starts Internet communication to display a Web screen acquired from a network via the communication I/F 20 on the display.

It may be determined in accordance with an individual gesture (such as a gesture issuing an instruction for mail communication, and a gesture issuing an instruction for Internet communication) recognized by the gesture recognition unit 120 whether the communication is mail communication or Internet communication. If the gesture recognized by the gesture recognition unit 120 is a common gesture and the mike 2 does not further collect any speech of the user, the control unit 20 may display, on a display, a selection screen that has a user select mail communication or Internet communication.

Figure 5:
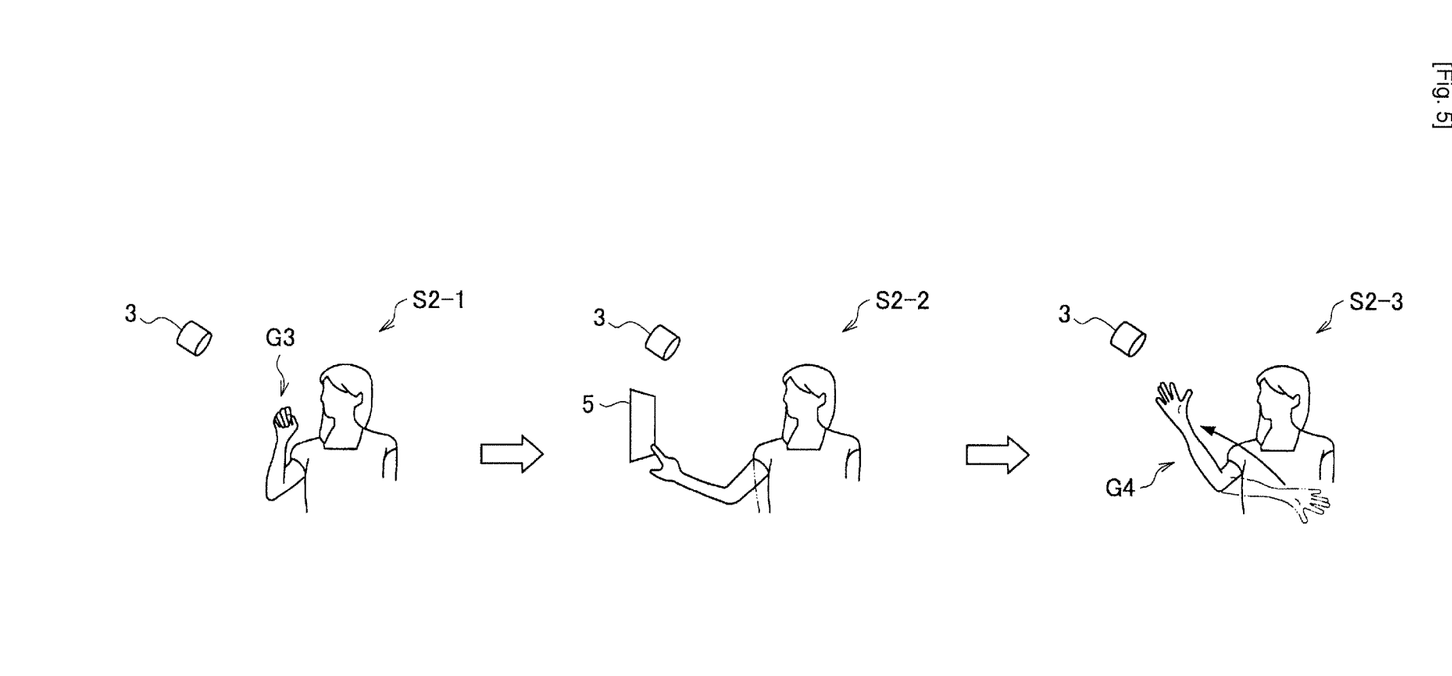
FIG. 5 is a diagram for describing an example of gesture input on mail communication according to the first embodiment.

With reference to FIG. 5, an example of gesture input on mail communication will be described. As illustrated in a state S2-1 of FIG. 5, when the camera 3 captures a gesture G3 made by a user moving a pen as if the user wrote letters, the gesture recognition unit 120 recognizes the gesture as a gesture issuing an instruction for mail communication. In this case, as illustrated in a state S2-2 of FIG. 5, the control unit 20 of the signal processing apparatus 1 performs control such that a mail form and an manipulation screen are displayed on a touch panel display 5 disposed around the user. The user touches on the manipulation screen displayed on the touch panel display 5, and inputs an address and text into the mail form. The control unit 20 may apply different language input setting in accordance with a direction in which letters are written in the same way as English input setting is applied if the gesture expresses that the letters are horizontally written, and Japanese input setting is applied if the gesture expresses that the letters are vertically written.

The gesture issuing an instruction for mail communication is not limited to the gesture G3 illustrated in FIG. 5. For example, the gesture may be a gesture in a sign language meaning "a mail is sent," a gesture made by raising a hand for manipulating the manipulation screen (such as a gesture made by raising both the hands for typing a keyboard), and a gesture made by drawing a square (a shape of a mail or a keyboard) in the air with a finger. Alternatively, a gesture made by writing a letter on a palm with the other hand may be adopted. In this way, various gestures are conceivable. Since what are meant by gestures are different for each country and for each culture, the gesture recognition unit 120 may perform different gesture recognition in accordance with nationality of a user.

When sending a mail after gesture input, a user may issue an instruction to send the mail by touching on a send button included in the manipulation screen, or may issue an instruction to send the mail through gesture input. For example, as illustrated in a state S2-3 of FIG. 5, when the camera 3 captures a gesture G4 made by shaking a hand forward in front of the body and the gesture recognition unit 120 recognizes the gesture as an instruction to send a mail, the control unit 10 sends a mail and finishes the processing.

Figure 6:
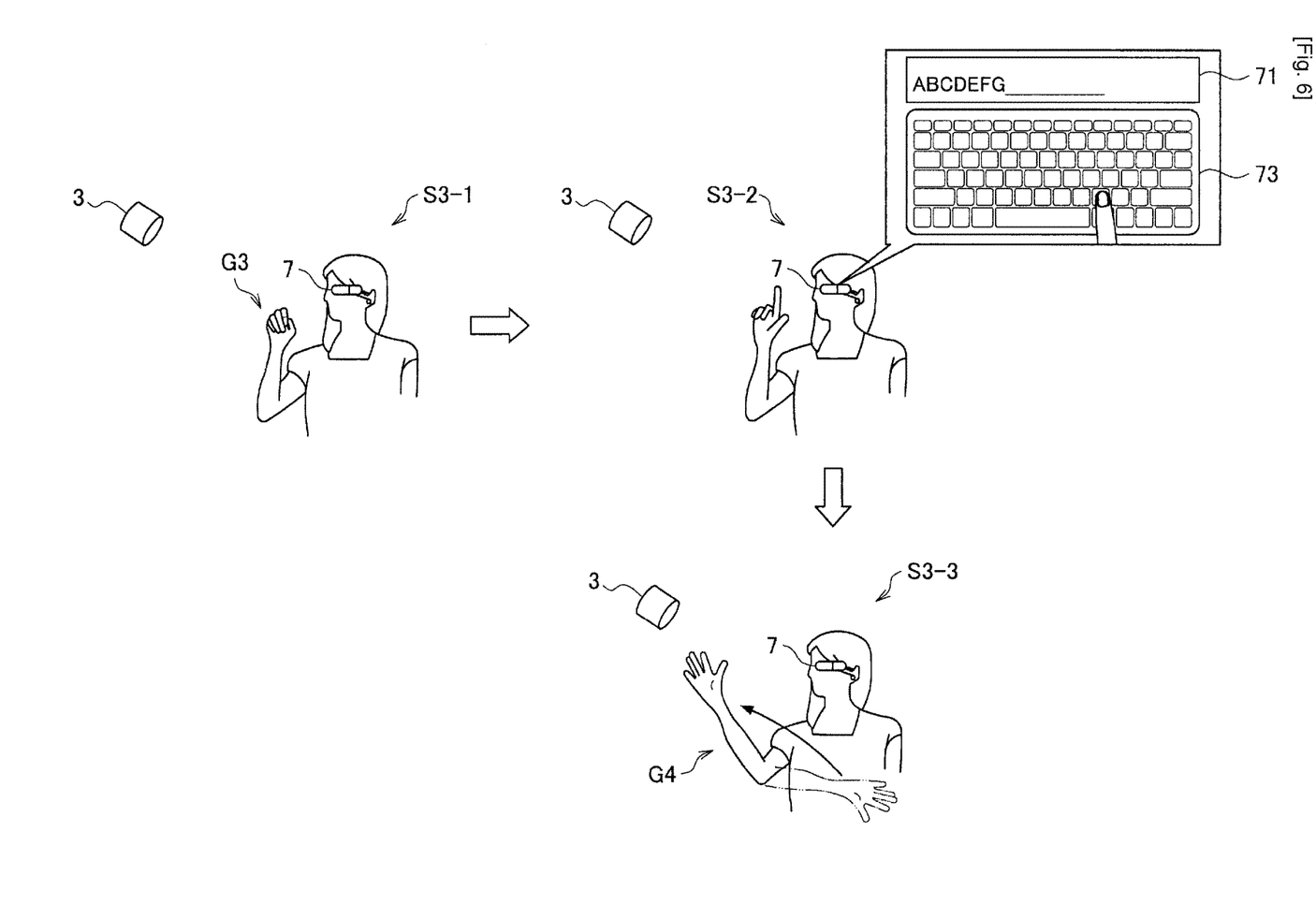
FIG. 6 is a diagram for describing another example of the gesture input on the mail communication according to the first embodiment.

As explained above, the example of gesture input on mail communication has been described. In FIG. 5, the touch panel display 5 disposed around a user, for example, on the wall, is used as an example of a display. However, a display that displays a mail form and the like is not limited thereto. For example, when a user wears a head-mounted display (HMD), the control unit 10 of the signal processing apparatus 1 transmits a control instruction from the communication I/F 20 through near field wireless communication such as Wi-Fi and infrared communications such that the HMD displays a mail form and the like. With reference to FIG. 6, it will be described that the HMD is used as an example of a display in this way.

FIG. 6 is a diagram for describing another example of gesture input on mail communication. An HMD 7 illustrated in FIG. 6 is, for example, a see-through HMD (glasses type display). A lens portion, which is disposed in front of an eye of a user, has a display disposed therein whose transmittance can be controlled. Since the display is usually controlled to be transparent, the display does not interfere with daily life if the display is constantly worn in the same way as glasses.

In the present embodiment, when the camera 3 captures the gesture 3 made by a user moving a pen as if the user wrote letters as illustrated in a state S3-1 of FIG. 6, the gesture recognition unit 120 recognizes the gesture as a gesture issuing an instruction for mail communication.

In this case, as illustrated in a state S3-2 of FIG. 6, the control unit 20 of the signal processing apparatus 1 transmits a control instruction from the communication I/F 20 to the HMD 7 through near field wireless communication such that the HMD 7 displays a mail form 71 and a manipulation screen 73 in augmented reality (AR). The user can input an address or text into the mail form 71 by overlaying a finger on a position of a predetermined key on the virtual manipulation screen 73 displayed on the HMD 7. Specifically, for example, a camera that captures images in a visual line direction of a user is disposed on the HMD 7. The camera captures a finger for key input, and compares a displayed position of each key on the virtual manipulation screen 73 with a position of the finger. The HMD 7 can hereby receive manipulation input. The HMD 7 also transmits input data to the signal processing apparatus 1.

If a mail is sent after the manipulation input is received, the user may manipulate a virtual send button included in the manipulation screen to issue an instruction to send a mail, or may issue an instruction to send a mail through gesture input. For example, as illustrated in a state S3-3 of FIG. 5, when the camera 3 captures the gesture G4 made by moving a hand forward in front of the body and the gesture recognition unit 120 recognizes the gesture as an instruction to send a mail, the control unit 10 sends a mail and finishes the processing.

In FIG. 6, it has been described that a display is realized as the HMD 7. However, a mike, a speaker, and a camera, and each configuration of the signal processing apparatus 1 illustrated in FIG. 2 may be provided on the HMD 7, and communication control through a gesture according to the present embodiment may be realized by the HMD 7.

3-2. Second Embodiment

Figure 7:
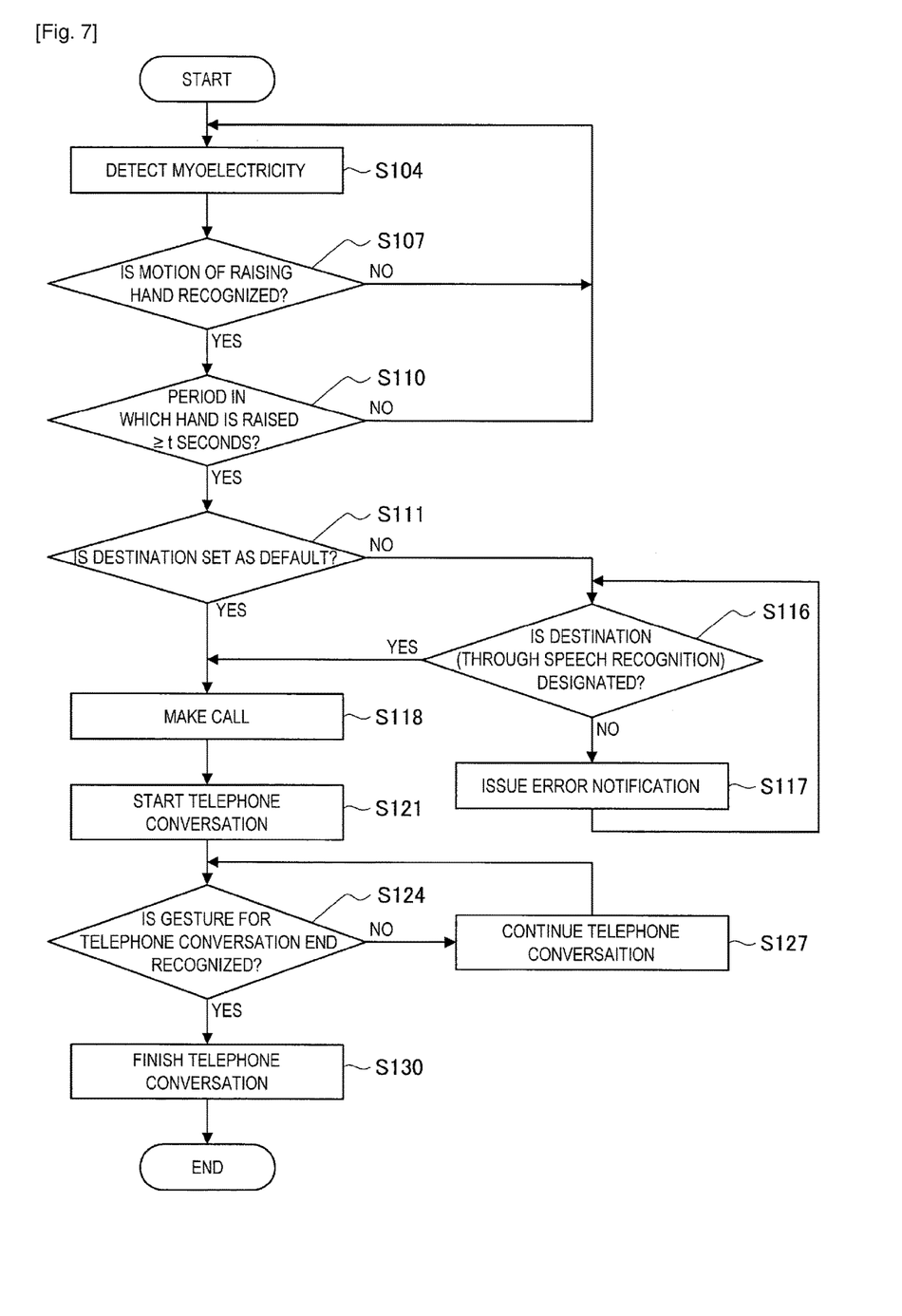
FIG. 7 is a flowchart illustrating processing of communication control through gesture recognition according to a second embodiment.

In the first embodiment, the gesture recognition unit 120 recognizes a gesture of a user on the basis of a captured image captured by the camera 3. A gesture recognition unit 120 according to the present embodiment is not limited thereto, and may recognize a gesture of a user on the basis of, for example, myoelectricity. With reference to FIG. 7, it will be described below that a gesture of a user is recognized on the basis of myoelectricity.

FIG. 7 is a flowchart illustrating processing of communication control through gesture recognition according to a second embodiment. In FIG. 7, processing will be described that is performed when a telephone communication start/end is controlled as an example.

As illustrated in FIG. 7, first, in step S104, the signal processing apparatus 1 detects myoelectricity of a user. Specifically, the signal processing apparatus 1 receives detection data detected by a myoelectric sensor attached on the skin of the user from the myoelectric sensor.

Subsequently, in step S107, the gesture recognition unit 120 of the signal processing apparatus 1 determines on the basis of the detection data detected by the myoelectric sensor whether the detected motion is a motion (gesture) of raising a hand (arm).

Next, if it is determined that the detected motion is a motion of raising a hand (S107/YES), the gesture recognition unit 120 determines, in step S110, whether a period in which a hand is raised is equal to or longer than a predefined time (such as t seconds).

Subsequently, if a hand is raised for t seconds or more (S110/YES), the gesture recognition unit 120 recognizes the motion as a gesture indicating a telephone communication start, and outputs the recognition result to the communication control unit 130. The communication control unit 130 determines, first, in step S111, whether a destination of telephone communication is set as default in advance, before starting telephone communication.

Next, if the destination is not set as default (S111/NO), the communication destination designating unit 110 designates, in step S116, a destination in accordance with a user instruction. Specifically, for example, the mike 2 collects the speech articulated while a user speaks a telephone number and a name of the destination, the speech recognition unit 100 recognizes the collected speech information, and the communication destination designating unit 110 designates the destination on the basis of the recognition result.

Subsequently, if the speech is not recognized and the destination is not designated (S116/NO), the control unit 10 issues, in step S117, an error notification. For example, announcement such as "please designate a destination" from the speaker 4 may be adopted as an error notification.

Next, if the destination is designated (S116/YES) and the destination is set as default (S111/YES), processing proceeds to step S118. In step S118, the communication control unit 130 makes a call to the destination (default or given destination) designated by the communication destination designating unit 110.

In steps S121 to S130, the same processing as the processing described in the same steps illustrated in FIG. 3 is performed.

3-3. Third Embodiment

Next, it will be described as a third embodiment that a given gesture is registered in the gesture DB 18. The gestures illustrated in FIGS. 4 to 6 are examples of gestures of issuing instructions for a telephone start/end and mail communication. Shapes of gestures and what the gestures mean are different in each country, each culture, and eras. In the present embodiment, the gesture DB 18 is therefore configured to store any given gesture. Gestures can hereby be input in accordance with each country, each culture, and eras. Such gesture registration is specially performed by a personal computer (PC), a smartphone, a notebook PC, and the like. The gesture DB 18 of the signal processing apparatus 1 may store the registered data through wired/wireless communication. In addition, the camera 3 illustrated in FIG. 1 and the touch panel display 5 illustrated in FIG. 5 may be used such that the gesture DB 18 of the signal processing apparatus 1 directly stores the data.

Figure 8:
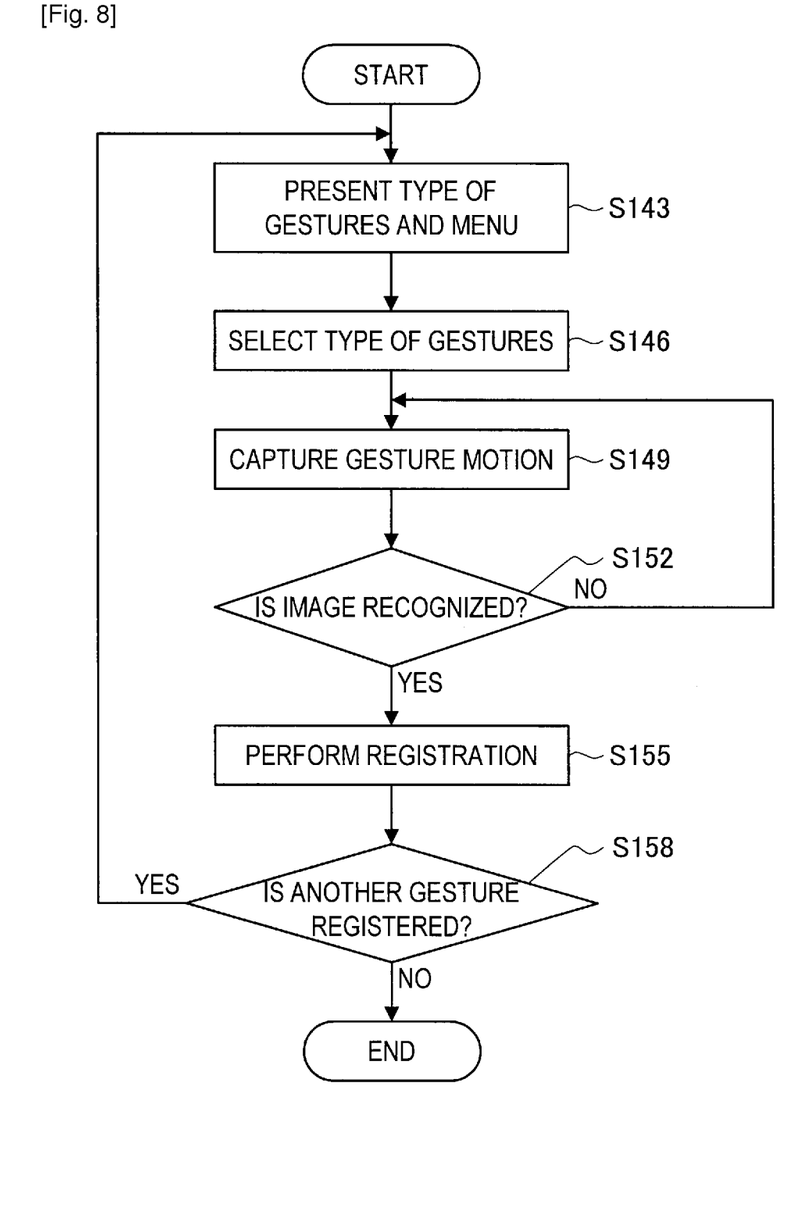
FIG. 8 is a flowchart illustrating operation processing of gesture registration according to a third embodiment.
Figure 9:
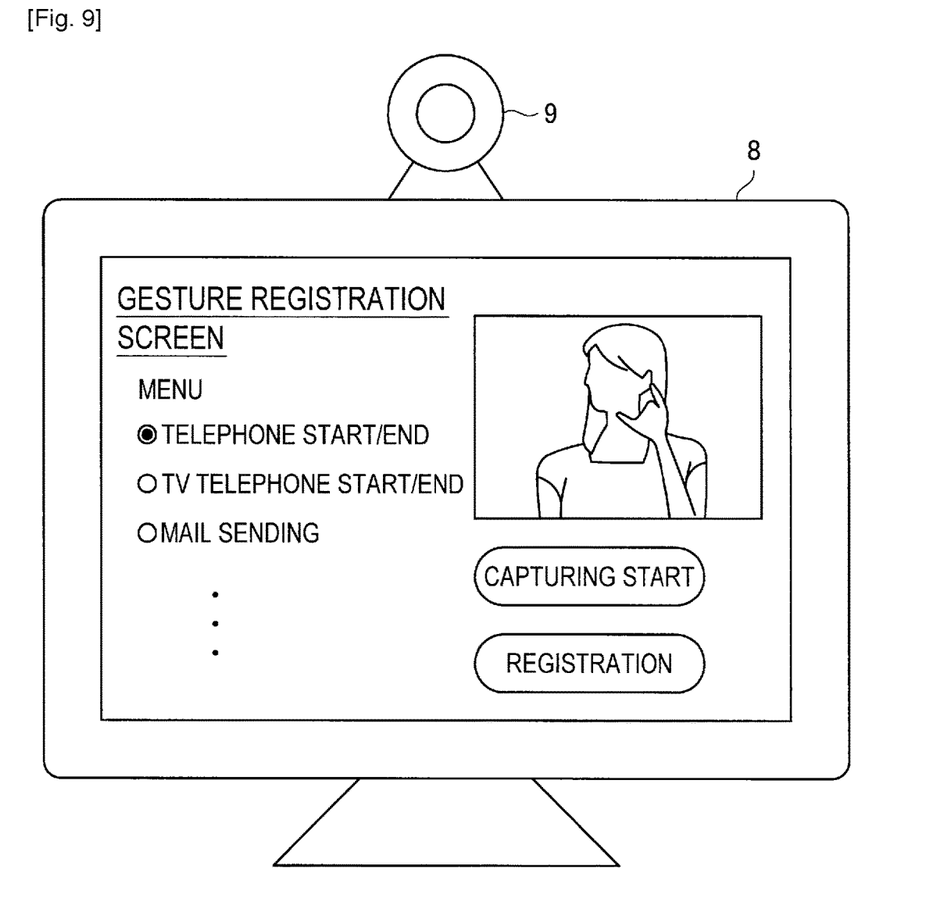
FIG. 9 is a diagram illustrating an example of a gesture registration screen according to the third embodiment.

With reference to FIGS. 8 to 9, operational processing of gesture registration according to the present embodiment will be described below. Additionally, in an example described below, it will be described that a personal computer (PC) specially performs gesture registration.

FIG. 8 is a flowchart illustrating operational processing of gesture registration according to the third embodiment. As illustrated in FIG. 8, first, in step S143, a PC displays a gesture type menu screen on a display of the PC. The gesture type menu screen is a menu screen used for selecting any of telephone, TV telephone, mail, Internet, and the like as a gesture type to be recorded.

Subsequently, in step S146, the PC receives a user's selection of a gesture type. For example, the user manipulates a manipulation unit (such as a mouse and a keyboard) of the PC to select a given gesture type.

Next, in step S149, the PC has a camera (camera connected to PC) capture a gesture motion of the user.

Subsequently, in step S152, the PC analyzes a captured image obtained by capturing the gesture motion, and determines whether the image (gesture motion) can be recognized. The PC may reproduce the captured image on the display to have the user determine whether the gesture is OK. The user visually confirms the captured image reproduced on the display. If the gesture is OK, the user selects a registration button that is displayed on the display of the PC.

Next, if the image is recognized (the user determines that the image is OK) (S152/YES), the PC performs, in step S155, registration processing by associating the captured image of the gesture with the selected gesture type (control content). Specifically, for example, the PC may transmit, to the signal processing apparatus 1, data in which the captured image of the gesture is associated with the selected gesture type (control content), and may have the gesture DB 18 of the signal processing apparatus 1 store the data.

In step S158, if another gesture is subsequently registered (S158/YES), processing of the PC returns to S143.

As explained above, the gesture registration processing according to the present embodiment has been described. FIG. 9 illustrates an example of a screen for the gesture registration. As illustrated in FIG. 9, the gesture registration screen is displayed on a display 8 of a PC. The gesture registration screen includes a type menu (such as a telephone start/end, a TV telephone start/end, and mail sending), a reproduction area of a captured image, a capturing start button, and a registration button. A camera 9 is disposed at the upper portion of the display 8. The PC can hereby register a gesture motion captured by the camera 9 in association with a gesture type selected by a user.

4. Conclusion

As described above, it is possible in the communication system according to the present embodiment to control a start/end of communication and a communication type in accordance with a gesture. Specifically, the signal processing apparatus 1 recognizes a gesture on the basis of a captured image obtained by the camera 3 capturing a gesture of a user, and starts/finishes telephone communication, prepares for mail communication (displays a mail form), and performs Internet communication, for example, in accordance with the recognized gesture.

The user can hereby issue an instruction to start/finish communication through a gesture in a new communication system that allows the user to communicate with an addressee in a remote location without having any communication terminal in a hand. An individual gesture indicating telephone, mail, Internet, and the like also allows the user to select a communication protocol (type of communication).

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

A communication system including
processing circuitry that responds to a recognition result by initiating an electronic communication session with a user-designated destination, wherein
the recognition result corresponds with a recognized gesture made by the user as detected by a sensor, and
the user-designated destination corresponds with the recognized gesture.

(2) The communication system of (1), further including the sensor, wherein the sensor includes an image sensor.

(3) The communication system of (1), further including the sensor, wherein the sensor includes a microphone.

(4) The communication system of (1), further including the sensor, wherein the sensor includes a motion sensor.

(5) The communication system of (1), further including the sensor, wherein the sensor includes a myoelectricity sensor.

(6) The communication system of (1), wherein
the recognized gesture includes a first gesture of a movement by the user and a second gesture of a voice command by the user.

(7). The communication system of (1), wherein the electronic communication session is a telephone call.

(8) The communication system of (1), further including
another sensor that recognizes a first gesture made by the user and causes the processing circuitry to initiate the electronic communication session, wherein
another sensor is different than the sensor that detects the recognized gesture.

(9) The communication system of (1), further including
the sensor, wherein the sensor includes an image capturing device that captures an image of the user, wherein
the image capturing device is located in a vicinity of the user so that the image capturing device can capture the image of the user.

(10) The communication system of (9), further comprising:
a different sensor that recognizes a different gesture by the user so as to trigger the processing circuitry to perform another step in the electronic communication session.

(11) The communication system of (1), further comprising:
at least one actuator.

(12) The communication system of (11), wherein
the at least one actuator includes at least one of a speaker and a display.

(13) The communication system of (11), wherein
the at least one actuator provides communications feedback from the user-designated destination to the user.

(14) The communication system of (1), wherein
the processing circuitry is configured to recognize the gesture as identifying a type of communication.

(15) The communication system of (14), wherein
the type of communication includes at least one of a telephone communication, an e-mail communication, and an Internet communication.

(16) The communication system of (11), wherein
the at least one actuator is located in an area surrounding the user, and the processing circuitry is configured to control the at least one actuator based on a type of communication initiated in the electronic communication session.

(17) The communication system of (16), wherein:
the at least one actuator being one of a display and a speaker.

(18) The communication system of (1), wherein
the processing circuitry is configured to associate the recognized gesture with the user-designated destination differently based on gesture attribute information associated with the user.

(19) A communication method including
detecting a recognized gesture by a user with a sensor;
responding with processing circuitry to a recognition result by initiating an electronic communication session with a user-designated destination, wherein
the user-designated destination corresponds with the recognized gesture.

(20) A non-transitory computer readable storage medium having stored therein computer readable instructions that when executed by a processor cause the processor to perform a communication method, the method including
detecting a recognized gesture by a user with a sensor;
responding with processing circuitry to a recognition result by initiating an electronic communication session with a user-designated destination, wherein
the user-designated destination corresponds with the recognized gesture.

Additionally, the present technology may also be configured as below.

(1)

A communication system including:
a communication destination designating unit configured to designate a communication destination of a user;
a gesture recognition unit configured to recognize a gesture of the user on the basis of a captured image obtained by capturing the user; and
a control unit configured to control communication with the communication destination in accordance with the gesture recognized by the gesture recognition unit.

(2)

The communication system according to (1), wherein the control unit performs control in accordance with the recognized gesture in a manner that the communication with the communication destination is started.

(3)

The communication system according to (1) or (2), wherein the control unit performs control in accordance with the recognized gesture in a manner that a calling state is set.

(4)

The communication system according to any one of (1) to (3), wherein the control unit performs control in accordance with the recognized gesture in a manner that the communication with the communication destination is finished.

(5)

The communication system according to any one of (1) to (4), wherein the control unit determines a type of communication with the communication destination in accordance with the recognized gesture.

(6)

The communication system according to (5), wherein the type of communication is telephone communication, Internet communication, or mail communication.

(7)

The communication system according to any one of (1) to (6), wherein the control unit shifts to a setting mode for setting a type of communication with the communication destination in accordance with the gesture.

(8)

The communication system according to any one of (1) to (7), further including:

an imaging unit disposed around the user, wherein the captured image is acquired by the imaging unit.

(9)

The communication system according to any one of (1) to (8), further including:

an actuator disposed around the user, wherein the control unit performs control in a manner that the actuator outputs data acquired from the communication destination.

(10)

The communication system according to any one of (1) to (9), wherein the communication destination designating unit designates a default destination as the communication destination.

(11)

The communication system according to any one of (1) to (9), wherein the communication destination designating unit designates a destination designated by the user as the communication destination.

(12)

The communication system according to (11), further including:

a speech recognition unit configured to recognize speech of the user, wherein the communication destination designating unit designates the communication destination in accordance with a name, a telephone number, or an address of a communication addressee recognized by the speech recognition unit.

(13)

The communication system according to (1) to (12), wherein the gesture recognition unit performs different gesture recognition in accordance with nationality of the user or a country in which the user stays.

(14)

A program for causing a computer to function as:

a communication destination designating unit configured to designate a communication destination of a user;

a recognition unit configured to recognize a gesture of the user on the basis of a captured image obtained by capturing the user; and a control unit configured to control communication with the communication destination in accordance with the gesture recognized by the recognition unit.

REFERENCE SIGNS LIST 1 signal processing apparatus
2, 2a to 2d microphone
3, 3a to 3b camera
4, 4a to 4d speaker
5 touch panel display
7 HMD
8 display of PC
9 camera
10 control unit
100 speech recognition unit
110 communication destination designating unit
120 gesture recognition unit
130 communication control unit
12 amplifier-ADC
14 DAC-amplifier
16 signal processing unit
18 gesture DB
20 communication I/F

The invention claimed is:

1. A communication system comprising:
processing circuitry that responds to a first recognition result by initiating an electronic communication session with a user-designated destination and that responds to a second recognition result by stopping the electronic communication session, wherein
the first recognition result corresponds with a first recognized non-contact gesture made by a user as detected by a sensor remote from the user, and the second recognition result corresponds with a second recognized non-contact gesture made by the user sensed remotely from the user, and
the user-designated destination corresponds with the first recognized non-contact gesture.

2. The communication system of claim 1, further comprising:
the sensor, wherein the sensor includes an image sensor.

3. The communication system of claim 1, further comprising:
the sensor, wherein the sensor includes a microphone.

4. The communication system of claim 1, further comprising:
the sensor, wherein the sensor includes a motion sensor.

5. The communication system of claim 1, further comprising:
the sensor, wherein the sensor includes a myoelectricity sensor.

6. The communication system of claim 1, wherein
the first recognized non-contact gesture includes a non-contact movement gesture of a movement by the user followed by a non-contact voice gesture of a voice command by the user.

7. The communication system of claim 1, wherein the electronic communication session is a telephone call.

8. The communication system of claim 1, further comprising:
another sensor that recognizes the first recognized non-contact gesture made by the user and causes the processing circuitry to initiate the electronic communication session,
wherein said another sensor is different than the sensor that detects the first recognized non-contact gesture.

9. The communication system of claim 1, further comprising:
the sensor, wherein the sensor includes an image capturing device that captures an image of the user,
wherein the image capturing device is located in a vicinity of the user so that the image capturing device captures the image of the user.

10. The communication system of claim 9, further comprising:
a different sensor that recognizes a gesture by the user different from the first and the second recognized non-contact gestures, so as to trigger the processing circuitry to perform another operation in the electronic communication session.

11. The communication system of claim 1, further comprising:
at least one actuator.

12. The communication system of claim 11, wherein
the at least one actuator includes at least one of a speaker and a display.

13. The communication system of claim 11, wherein the at least one actuator provides communications feedback from the user-designated destination to the user.

14. The communication system of claim 1, wherein the processing circuitry is configured to recognize the first recognized non-contact gesture as identifying a type of communication for the electronic communication session.

15. The communication system of claim 14, wherein the type of communication includes at least one of a telephone communication, an e-mail communication, and an Internet communication.

16. The communication system of claim 11, wherein the at least one actuator is located in an area surrounding the user, and the processing circuitry is configured to control the at least one actuator based on the type of communication initiated in the electronic communication session.

17. The communication system of claim 16, wherein: the at least one actuator being one of a display and a speaker.

18. The communication system of claim 1, wherein the processing circuitry is configured to associate the first recognized non-contact gesture with the user-designated destination differently based on gesture attribute information associated with the user.

19. A communication method comprising:
detecting, remotely from a user, a first recognized non-contact gesture of the user with a sensor remote from the user;
responding with processing circuitry to a first recognition result by initiating an electronic communication session with a user-designated destination, the first recognition result corresponding to the first recognized non-contact gesture;
detecting, remotely from the user, a second non-contact gesture of the user; and
responding with the processing circuitry to a second recognition result by stopping the electronic communication session with the user-designated destination, the second recognition result corresponding to the second recognized non-contact gesture, wherein
the user-designated destination corresponds with the first recognized non-contact gesture.

20. A non-transitory computer readable storage medium having stored therein computer readable instructions that when executed by a processor cause the processor to perform a communication method, the communication method comprising:
detecting, remotely from a user, a first recognized non-contact gesture of the user with a sensor remote from the user;
responding to a first recognition result by initiating an electronic communication session with a user-designated destination, the first recognition result corresponding to the first recognized non-contact gesture;
detecting, remotely from the user, a second non-contact gesture of the user; and
responding to a second recognition result by stopping the electronic communication session with the user-designated destination, the second recognition result corresponding to the second recognized non-contact gesture, wherein
the user-designated destination corresponds with the first recognized non-contact gesture.

* * * * *